Aug. 22, 1950          D. A. WILKIE          2,519,988
METHOD AND DEVICE FOR PHOTOGRAPHIC SCANNING
Filed April 26, 1945
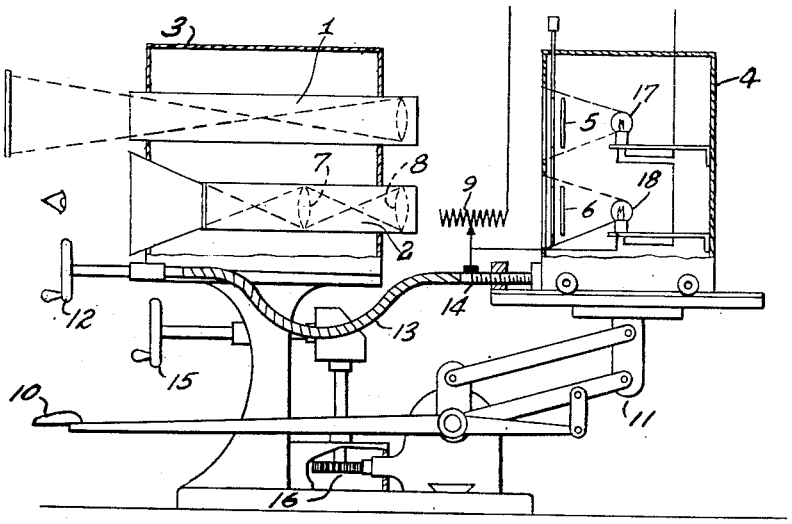
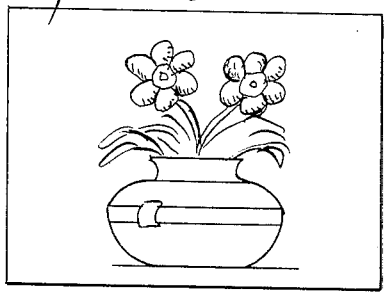
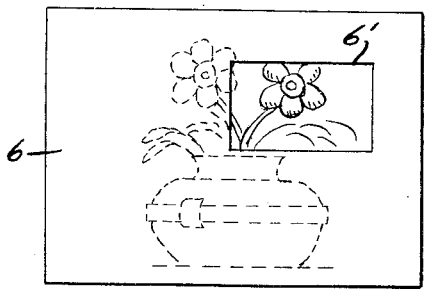
INVENTOR.
DAVID A. WILKIE
BY
ATTORNEY.

Patented Aug. 22, 1950

2,519,988

UNITED STATES PATENT OFFICE 2,519,988

METHOD AND DEVICE FOR PHOTOGRAPHIC SCANNING

David A. Wilkie, New York, N. Y.

Application April 26, 1945, Serial No. 590,339

6 Claims. (Cl. 88—16)

This invention relates to a method and device for the panoramic scanning and reproduction of slide transparencies, photographs, diagrams, drawings, maps, paintings and the like.

The main object of the invention is to provide a method and a device for the photographic scanning and the reproduction, in whole or in part, of slide transparencies, and, when employing frontal lighting, of photographs, diagrams, drawings, maps, paintings and similar flat and uniplanar representations. More particularly, it is an object of this invention to provide a method and means for the panoramic scanning of accurately selected portions of a planar image by means of a television or motion picture camera or the like.

As an example of the application of this invention, let it be supposed that there is being transmitted a television program involving a commentary upon the map of the United States. It is desired first to transmit the entire map of the United States, then a close-up of the Milwaukee area, after which the camera is to move across the map to transmit a close-up of the Denver area. With the ordinary camera it would be impossible accurately to center the focal axis of the camera upon these selected areas. The reason for this can easily be understood if it is assumed that the representation of the map in this instance is 6″x8″, which is not an unusual size. It is clear that with present day equipment the focal axis of the camera finder would necessarily be outside the actual area of the map itself while the camera was focused thereon. There would thus be no way in which the operator could accurately determine when the camera was centered upon the selected map areas.

With the present invention this disability is entirely eliminated.

In accordance with the invention, in the process of reproduction, details and particular portions of the representation being scanned can be projected in any optional enlargement or on any optional scale, determined by the direction of focus and the degree of magnification used in the reproducing mechanism. In accordance with the design of the invention, the representation, which is to be scanned, is set up with a copy of the representation (the control copy) in a box housing. This housing which is common to both the original representation and the control copy cooperates with a scanning mechanism, and the action of scanning is achieved by either moving the housing in relation to said scanning mechanism or by moving the scanning mechanism in relation to the housing. According to the invention, the scanning mechanism consists of two camera-like parts, one of the said cameras being focused upon the original representation, and the second upon the control copy. The two cameras are hooked together in such a way that as the operator scans the control copy, or diagrammatic representation of the original, whose image falls upon a ground glass, he automatically focuses the first camera on the original representation or any chosen part of it. The reproduced image, thus created, may then be cast on any kind of a surface that is placed in proper focus of the first camera, that is, a flat surface such as a screen, film, or on the photo-sensitive plate of a television camera tube.

According to the invention means are provided by which the box housing or the cameras can be displaced and adjusted backward, in a vertical direction upward and downward and sideways in both directions, and these movements may be combined in any diagonal movement. Blocks in the mechanism prevent any tilting and resulting "keystoning" of the image. The method of this invention makes it possible to separate details in the representation from other parts of the representation and to examine them clearly by themselves. Their relation to other parts of the representation is only indicated by the motion of scanning or panning from one part to another.

The device for carrying out the method of this invention consists of two main parts, i. e. a camera housing and a housing carrying the representations. Their functional relationship to one another is in the direction of the movements stated above. The constant aperture of the cameras may be fixed at any aspect ratio that equals that of the pictures to be scanned, that is, usually 3x4.

The purpose of such a device is to produce a moving and controlled image, taken from the transmitted or reflected light emanating from the original representation.

An embodiment of the device in accordance with the invention is shown diagramatically in Figs. 1 to 3, inclusive, of the drawing, in which:

Figure 1 is a side elevational view of a device embodying the principles of this invention, portions being shown cut away and other portions being shown diagramatically;

Figures 2 and 3 are more or less diagrammatic views showing, respectively, an original representation intended to be scanned by means of the device and a reproduction thereof for use with the device.

The device consists of two camera-like parts 1, 2, in a box housing 3, and a second housing 4 carrying an original representation 5 to be scanned and a control image or reproduction 6 of the representation. Camera 1 focuses upon the original picture 5 and acts as the projection apparatus for this picture. The other camera 2, or viewer, focuses upon the reproduction or control picture 6 and enables the adjustment or focusing of this viewer 2 on the control picture and thereby also controls the focus of camera 1 on the original picture.

The reproducing lens in camera 1 can be adjusted to focus upon the whole or upon any part of a picture placed in front of it, casting the transmitted image upon any flat surface, such as a screen, a motion picture film, an iconoscope plate of a television camera tube or the like. The parallel control lens which operates the reproducing lens by means of connections, focuses upon a duplicate picture or diagram of the picture, casting its image upon a ground glass surface watched by the operator. The mechanism for controlling the relative in and out movements of the slide housing 4 is mechanically connected with the two cameras in any suitable manner to automatically control their focus.

The motion of scanning is horizontal, vertical and depthward or any combination thereof, and adjustable stops in the mounting may be used to determine the extent of scanning in each individual case. While the mechanism may be of any suitable type, it must prevent tilting of the cameras or the pictures in order to avoid so-called "keystoning" of the image.

It is preferable to provide the viewer 2 with two lenses 7, 8 or with a system of prisms or mirrors for the purpose of rectifying the image in making it right side up. This enables the control operator to see the portion 6' of the reproduction 6, corresponding to the scanned portion of the representation, right side up.

In the apparatus illustrated, a foot pedal 10 is provided for moving the slide-box 4 up and down, through a system of levers 11. A hand wheel 12, acting through a flexible cable 13 and lead screw 14 provides for moving the slide-box 4 forward and backward or in and out. A second hand wheel 15, through a rack and pinion mechanism 16, provides for moving the slide-box 4 to the right and left. These several movements can thus be simultaneously combined. The mechanism shown is merely one example of a device for practicing the method of this invention, and other devices for the purpose, within the spirit of the invention and the scope of the appended claims, will readily suggest themselves to those skilled in the art.

In the method described, transparencies may be lighted from the back whereas non-luminous photographs and the like must be lighted from the front. In case slide transparencies are used for the original picture and the control picture, an automatic rheostat as diagrammatically illustrated at 9, may be provided, connected in series with the lamps 17 and 18 which illuminate the representation 5 and reproduction 6, respectively, to increase and diminish the amount of light transmitted in proportion to the depth of focus in order to maintain even distribution of light.

From the foregoing description, taken together with the accompanying drawings, it will be readily apparent to those skilled in the art that this invention provides a method and device for accurately and selectively "panning" desired portions of a planar representation in a predetermined sequence, and that the provision of the reproduction or diagram of the picture, upon which the view finder is focused, enables an operator of a motion picture or television camera to accurately accomplish such panoramic scanning from area to area.

I claim:

1. The method of controlling the scanning of a representation by a television camera focused thereon to obtain a continuous panoramic image of selected portions thereof which comprises: preparing a reproduction of the representation which exists independently of the representation; mounting the representation and the reproduction thereof in juxtaposition to one another; focusing viewing means upon the reproduction of the representation; effecting relative motion between the viewing means and the reproduction to center the focal axis of the viewing means upon selected areas of the reproduction; and utilizing the motions required to center the focal axis of the viewing means upon the selected areas of the reproduction to effect a proportionate corresponding relative motion between the television camera and the representation, so that selection of the areas of the representation scanned by the television camera is accurately controllable by reference to the viewing means.

2. The method of controlling the scanning of a representation by a motion picture camera focused thereon to obtain a continuous panoramic image of selected portions thereof which comprises: preparing a diagrammatic reproduction of the representation which exists independently of the representation; mounting the representation and the reproduction thereof in juxtaposition to one another; focusing viewing means upon the reproduction of the representation; moving the viewing means and the reproduction relative to one another to center the focal axis of the viewing means upon selected areas of the reproduction; and moving the motion picture camera and the representation relative to one another in synchronism with the relative motion between the viewing means and the reproduction so that selection of the areas of the representation photographed by the motion picture camera is accurately controllable by reference to the viewing means.

3. The method of controlling the scanning of a representation by a scanning device focused thereon to obtain a panoramic image of selected portions thereof, which comprises: preparing a reproduction of the representation which exists independently of the representation; holding the reproduction in fixed relationship to the representation; focusing viewing means upon the reproduction of the representation; moving the viewing means and the reproduction relative to one another to center the focal axis of the viewing means upon selected areas of the reproduction; and proportionately and correspondingly moving the scanning device relative to the representation, so that selection of the areas of the representation scanned by the scanning device is accurately controllable by reference to the viewing means.

4. Means for scanning a planar representation to obtain a panoramic image of selected portions thereof comprising: a physical reproduction of the representation existing entirely apart from the representation; supporting means holding the representation to be scanned and the reproduction thereof in fixed edgewise spaced relationship with one another and in parallel planes; scanning means; mounting means holding the scanning means with its focal axis perpendicularly intersecting the representation; viewing means; mounting means holding said viewing means with its focal axis parallel with that of the scanning means and perpendicularly intersecting the reproduction; the supporting means for the representation and its reproduction and the mounting means for the scanning and viewing means being movable in three dimensions relative to each other; the center to center distance between the representation and its reproduction being the same as the distance between the focal axes of the scanning means and the viewing means so that the portion upon which the viewing means is focused will be an exact counterpart of the portion of the representation upon which the scanning means is focused so that the scanning of the representation may be controlled by reference to the viewing means; and means for effecting relative motion in any one of three dimensions between the mounting means for the scanning and viewing means as one unit and the supporting means for the representation and its reproduction as another unit.

5. Apparatus as defined in claim 4 in which the scanning means is a television camera.

6. Apparatus as defined in claim 4 in which the scanning means is a motion picture camera.

DAVID A. WILKIE.

REFERENCES CITED

The following references are of record in the file of this patent:

UNITED STATES PATENTS

| Number | Name | Date |
|---|---|---|
| 1,782,860 | Reipert | Nov. 25, 1930 |
| 2,013,288 | Porter | Sept. 3, 1935 |
| 2,286,628 | Kidder | June 16, 1942 |
| 2,333,389 | Ringer | Nov. 2, 1943 |
| 2,364,363 | Howell | Dec. 5, 1944 |
| 2,384,232 | Beers | Sept. 4, 1945 |

FOREIGN PATENTS

| Number | Country | Date |
|---|---|---|
| 174,622 | Great Britain | June 25, 1923 |
| 610,146 | Germany | Mar. 4, 1935 |